United States Patent [19]

Pipkins

[11] 3,825,111

[45] July 23, 1974

[54] CONTAINER CONTAINING A CARBONATED PRODUCT

[75] Inventor: David D. Pipkins, Downers Grove, Ill.

[73] Assignee: The Valspar Corporation, Minneapolis, Minn.

[22] Filed: Apr. 18, 1973

[21] Appl. No.: 352,214

Related U.S. Application Data

[60] Division of Ser. No. 154,411, June 18, 1971, Pat. No. 3,747,523, which is a continuation-in-part of Ser. No. 80,833, Oct. 15, 1970, Pat. No. 3,705,044.

[52] U.S. Cl............. 206/84, 220/88 B, 261/119 R
[51] Int. Cl............................................. B65d 81/00
[58] Field of Search...... 106/309, 311, 316; 206/84; 220/88 B; 261/119 R

[56] References Cited
UNITED STATES PATENTS

| 2,153,555 | 4/1939 | Gallery | 220/88 B |
| 2,507,380 | 5/1950 | Morrison | 220/88 B |
| 3,464,546 | 9/1969 | Thomka | 206/84 |

FOREIGN PATENTS OR APPLICATIONS

| 736,590 | 9/1955 | Great Britain | 106/309 |

Primary Examiner—William I. Price
Assistant Examiner—Steven E. Lipman
Attorney, Agent, or Firm—Morsbach, Pillote & Muir

[57] ABSTRACT

A container has a carbonated paint or ink therein and carbon dioxide is interstitially spaced in an amount sufficient to evolve into the head space of the container to provide a protective atmosphere having improved "anti-skinning" characteristics.

4 Claims, 4 Drawing Figures

CONTAINER CONTAINING A CARBONATED PRODUCT

CROSS-REFERENCE

This application is a division of application Ser. No. 154,411, filed June 18, 1971, now U.S. Pat. No. 3,747,523; which in turn was a continuation-in-part of application Ser. No. 80,833, filed Oct. 15, 1970, now U.S. Pat. No. 3,705,044.

BACKGROUND

The invention pertains to carbonated paints, inks, and solvents, and to a method of printing using carbonated ink.

Paint is a mixture of a liquid and one or more powders called pigment. The liquid that carries the pigment is called a vehicle which may include solvents or thinners, binders, driers, and plasticizers. Typical solvents are turpentine, petroleum distillates, aromatic hydrocarbons, etc. Most solvents are classified as "organic solvents." The term paint, as used herein, is intended to include ink, colorants and the like which are manufactured from pigments and vehicles or solvents.

During the manufacture or use of paint, ink, and the like, a fire hazard exists because of the use of flammable materials. For example, one area of fire hazard is at the mill where the pigment is "ground" and a temperature increase results. Another area is where the material (e.g., ink) is being applied as by a press. A static spark can ignite the volatile solvent and cause an explosion. It is advantageous to suppress flammability and reduce the fire hazard.

Paint is subject to oxidation during storage either in the plant, in the unopened can, or in the can after opening. Additionally, solvents can be lost into the head space above the paint. Consumers are familiar with skinning of paint caused by oxidation. It is desirable, therefore, to have a product which represses oxidation and/or loss of solvents during storage.

SUMMARY

The present invention relates to new products in the form of carbonated paints, inks and solvents. The invention also relates to a method of printing using carbonated ink.

It is a general object of the present invention to overcome the above-described deficiencies of the prior art as it relates to paint and ink of the type which includes a pigment and an organic solvent.

Another object is to provide a product with reduced fire hazard.

It is another object to provide a product in accordance with the foregoing object which provides its own self-inerting atmosphere.

Still another object of the invention is to provide a product which overcomes the problem of "skinning" during storage.

Another object is to provide a method of printing which has any of the following advantages: increased print out, a decrease in static charges, or a reduction of flashing potential.

These, and other objects and advantages of the present invention, will become apparent as the same becomes better understood from the following detailed description when taken in conjunction with the accompanying drawings.

DRAWINGS

DESCRIPTION

Figure 1:
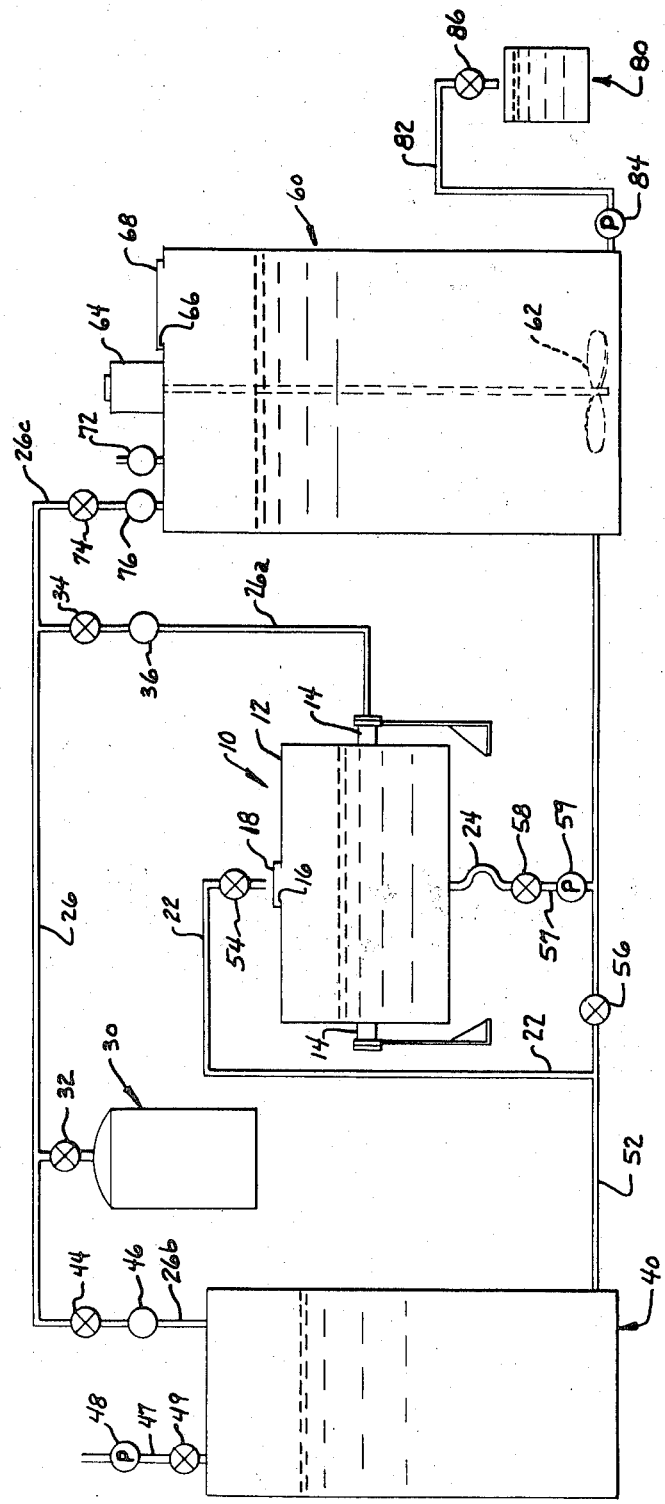
FIG. 1 is a diagrammatic view of an apparatus suitable for producing the product of the present invention.

One of the major operations in the manufacture of paint and ink is properly dispersing the pigment particles in the liquid vehicle or solvent. Various apparatus are provided for this purpose including ball mills, sand mills, roller mills and the like. The basic purpose of these mills is to intimately mix and wet the solid pigment particles with the liquid vehicle or solvent. This is a much more difficult process than would be readily appreciated and the usual milling or grinding time in a ball mill by present methods, ranges from about 6 hours for a formula that is easy to grind (e.g., a titanium dioxide formula white paint) up to 24 hours for a formula that is difficult to grind (e.g., a carbon black formula black paint). An average formula can take up to 12–16 hours of grinding time.

It has been found that the time required to disperse the pigment can be markedly reduced, for example to about one-third the time previously required or less, if a pressurized carbon dioxide atmosphere is utilized during milling. In other words, it has been found that carbon dioxide in substantial quantities in the mixture of paint pigment and solvent will markedly aid dispersion of the pigment. This appears to result at least in part, from an increased energy level and Brownian motion caused by the presence of carbon dioxide. In accordance with the present invention, the carbon dioxide can be introduced directly into the mill either before or during milling. THe pressure of carbon dioxide added is preferably in the range of 7 to 100 p.s.i.g.

It has been found that it is possible to achieve these improved results by introducing the carbon dioxide atmosphere into the liquid organic solvent prior to entry into the mill; for example, while it is in a storage tank. By proper regulation, the organic solvent will contain the desired amount of carbon dioxide when introduced into the mill. The carbon dioxide can be absorbed by the organic solvent by first pressurizing the storage tank and then pumping the organic solvent into the tank at a pressure above the pressure of the carbon dioxide atmosphere. Since the organic solvent will absorb the carbon dioxide, the solvent can be pumped into the tank without venting the same, as is presently required. It is estimated that as much as 4 percent of solvents are lost through venting and, with some solvents, this adds to pollution of the atmosphere. By carbonating the solvent, vaporization of the solvent is suppressed. Also under some conditions, the pressurized tank permits the delivery of the solvent to the mill without necessitating a pump as is presently required.

If sufficient carbon dioxide is interstitially spaced in the organic solvent through absorption, no carbon dioxide need be added at the mill. Preferably the storage tank pressure is at least 50 p.s.i.g. to achieve optimum results in this event. However, it is contemplated that carbon dioxide can be supplied to both the storage tank and the mill, if desired.

After the pigment has been dispersed or ground in the liquid solvent by the mill, it is delivered to a tinting tank where a tinter adds additional solvent and pigments, as described above. Surprisingly, it has been found that, in addition to a reduced grinding or milling time, the pigments and organic solvents ground in the presence of carbon dioxide have a greater "tinctorial strength." This is also indicative of improved dispersion of the pigment. The result is that the product from the mill can have greater amounts of solvents or diluents added and yet obtain the required coverage of the paint or ink.

After tinting, the paint or ink can then be stored or put into a container for shipping. If a carbonated solvent is used during the tinting operation, the resulting paint or ink contains a high amount of carbon dioxide; preferably in excess of one volume and up to four volumes of carbon dioxide per volume of the organic solvent in the paint or ink. Some of this carbon dioxide can then evolve into the head space of the container to maintain an inert atmosphere in the container. In a paint can, this evolving continues through several openings by a consumer, and reduces loss of solvent and also inhibits "skinning" of the paint. In an industrial use of ink, this evolving provides an inert atmosphere above the ink and reduces the fire hazard. It has also been found that a carbonated ink has an increased conductivity which helps prevent the build up of dangerous static charges.

Reference is now made more particularly to the drawings which diagrammatically illustrate the best presently known apparatus of the present invention and which apparatus is one means of performing the method of the present invention.

The mill is in the form of a ball mill 10 which is essentially a large drum 12 mounted for rotation about a horizontal axis 14. As is usual, the mill contains pigment, vehicle or solvent, and balls, pebbles or the like which are tumbled as the mill rotates to intimately disperse the pigments in the solvent. The drum 12 has a removable cover 18 covering an opening 16 through which the pigments can be placed into the mill. The solvent is supplied through a conduit 22 arranged to dump through opening 16. Carbon dioxide is introduced into the mill through a branch conduit 26a which is connected to a carbon dioxide supply tank 30 by means of a main conduit 26. The carbon dioxide is preferably fed to the mill at a pressure in the range of 7 to 100 p.s.i.g. Branch conduit 26a is advantageously coaxial with axis 14 so that carbon dioxide can be supplied while the drum 12 is rotating. A valve 32 is conveniently provided at the outlet of tank 30. A valve 34 and a pressure regulator 36 are advantageously interposed in conduit 26a to control the flow of carbon dioxide to the mill. The drum 12 has an outlet to which a flexible conduit 24 can be connected to draw off the ground pigment and organic solvent.

A storage tank 40 for the organic solvent preferably is unvented. A second branch conduit 26b is connected to the tank 40 and to main conduit 26 to feed carbon dioxide to the tank. A valve 44 and a pressure regulator 46 are interposed in conduit 26b to control the flow of carbon dioxide to the storage tank. After the tank 40 has been supplied with carbon dioxide under pressure, for example at 50 p.s.i.g., the organic solvent is pumped into the tank through a line 47 by a pump 48. A valve 49 is provided in line 47. The pump is arranged to supply the organic solvent into the tank 40 at a pressure above the pressure of the carbon dioxide. The solvency of the carbon dioxide increases with pressure increase and, as the carbon dioxide is absorbed by the solvent, the amount of free carbon dioxide is reduced. The carbon dioxide is absorbed and becomes interstitially spaced in the solvent and there is effectively no pressure increase as the solvent is supplied into the tank.

At the bottom of storage tank 40 is an outlet conduit 52 which leads to the conduit 22 and to a tinting tank 60. A valve 54 in conduit 22 controls flow of the carbonated organic solvent to the mill 10; while a valve 56 in conduit 52 controls flow to the tinting tank 60. It will be noted that no pump is provided for moving the carbonated organic solvent to the mill or tinting tank. However, a pump could be provided if desired or if required, as when the solvent must be lifted a height beyond what the pressure of carbon dioxide will lift. A conduit 57 is connected to conduit 52 and flexible conduit 24 to effectively connect the mill 10 to the tinting tank 60. A valve 58 and a pump 59 are interposed in conduit 57 to control the flow from the mill 10.

As is usual, tinting tank 60 is provided with a mixer or agitator 62 driven by a motor 64 to mix the milled pigment and solvent with any additional solvents, pigments or additives. The tank is provided with an opening 66 through which the additional pigments and additives may be added. Opening 66 is provided with a cover 68 which may or may not seal the tank 60. The tank is provided with a poppet-type vent 72 to that the tank is vented. If cover 68 does not seal the tank, it should be arranged that a slight pressure (e.g., 3–6 p.s.i.g.) can be maintained in the head space. The head space is filled with carbon dioxide evolved from the paint or ink. This reduces fire hazard and inhibits vaporization of the solvent. While the evolved carbon dioxide is sufficient for these purposes most of the time, the tank is advantageously connected to the main conduit 26 by way of branch conduit 26c in which is interposed a valve 74 and a pressure regulator 76. In this manner, the tank 60 can be maintained with an inert atmosphere even when no product is contained therein.

After the above-described operation, there is a carbonated paint or ink product. This may be dispensed into a tank or can 80 through a conduit 82 connected to tinting tank 60. A pump 84 and a valve 86 are provided to control flow through the conduit 82. This dispensing can be accomplished either automatically or by a manual operation.

The carbonated product in can 80 preferably contains in excess of one volume of carbon dioxide per volume of organic solvent therein and up to about four volumes per volume. In this manner, the carbon dioxide will evolve into the heat space of the container and provide an inert atmosphere. In the case of paint, it has been found that this evolved carbon dioxide inhibits vaporization of the solvent and reduces "skinning" tendencies. In the case of ink, it has been found that the carbon dioxide will evolve and provide a protective blanket even in an open container. This aids in flammability suppression.

It has been found that carbonation increases the flash point of the organic solvents. This also aids in reduced flammability. It has also been found that carbonation increases the conductivity of the solvents and it is believed that this helps reduce build up of static charges which might cause an explosion.

In using carbonated ink in a printing operation, it has been found that there is as much as 20 percent greater printout. In other words, there is better lay or coverage with the carbonated ink. While one cannot be certain, this is possibly due to the increased conductivity of the carbonated ink and less static on the printing rolls.

The following examples will further illustrate the practice of this invention:

EXAMPLE 1

| | Parts by weight |
|---|---|
| 1. Benzidene Yellow | 343 |
| 2. Primrose Chrome Yellow | 1588 |
| 3. Toluol | 361 |
| 4. Ethyl Cellulose Solution 25% N.V. in Lacquer Diluent Hydrocarbon Solvent | 962 |
| 5. Zinc Resinate and Ethyl Cellulose Solution* | 4962 |
| 6. Lacquer Diluent Hydrocarbon | 1784 |
| *This ingredient has the following composition by weight: | |
| Zinc Resinate | 37% |
| Ethyl Cellulose | 3% |
| Lacquer Diluent | 5% |
| Acetone | 7% |
| Isopropyl Alcohol | 11% |
| Hexane | 25% |
| Toluol | 12% |

The above is a formula for yellow gravure ink. Ingredient no. 6 is added after milling for reduction. Ingredients 1–5 were milled in a ball mill of a laboratory size. The mill had 2,388 grams of steel balls therein. Four identical mills were utilized in the tests and each mill was turned the same number of revolutions for the same length of time. One mill held a control sample, and the other mills were charged with carbon dioxide to the pressure indicated, stabilized for 1 hour, and then repressured to the pressure indicated. Various tests were run for different lengths of milling time. The ground ingredients 1–5 were then reduced. Each sample was tested for fineness of grind by a North Standard grind gauge which is used to measure dispersion. The optical density measured on a Densichron densitometer manufactured by Welch Scientific Co., Skokie, Ill. The following results were obtained:

| Test | Grind Time | $CO_2$ | Fineness | Increased Tint Strength |
|---|---|---|---|---|
| 1 | 1 hour | None | 2 | Control |
| | do. | 15 psig. | 2½ | 4% |
| | do. | 50 psig. | 3 | 7 |
| | do. | 75 psig. | 4 | 11 |
| 2 | 2 hours | None | 5½ | Control |
| | do. | 15 psig. | 6 | 10% |
| | do. | 50 psig. | 6 | 7 |
| | do. | 100 psig. | 6½ | 9 |
| 3 | 4 hours | none | 7 | Control |
| | do. | 15 psig. | 8 | 8% |
| | do. | 50 psig. | 8 | 10 |
| | do. | 100 psig. | 8 | 10 |

EXAMPLE 2

| | Parts by weight |
|---|---|
| 1. Raven 40 Black Densed | 122 |
| 2. Atomite | 300 |

EXAMPLE 2-Continued

| | Parts by weight |
|---|---|
| 3. Nuact Paste | 25 |
| 4. 13% Bentone No. 38 Slurry | 153 |
| 5. Medium Oil Alkyd Resin (Fed. Spec. TT-R-266 Type 3) | 918 |
| 6. Methyl Ethyl Ketoxime | 6 |
| 7. 24% Lead Napthenate | 37 |
| 8. 4% Calcium | 25 |
| 9. Mineral Spirits | 319 |
| 10. Same as ingredient No. 5 | 2223 |
| 11. Oil modified Polyurethane Resin at 60% N.V. in Mineral Spirits | 649 |
| 12. 6% Cobalt Napthenate | 12 |
| 13. 6% Manganese Napthenate | 12 |

The above is a formula for a black enamel paint. Ingredients 1–9 were milled as in Example 1 except 15 hours were allowed for stabilization. Ingredients 10–13 were added after milling. The finished product was reduced with titanium dioxide paste and measurements taken as in Example 1. The following results were obtained:

| Test | Grind Time | $CO_2$ | Fineness | Increased Tint Strength |
|---|---|---|---|---|
| 4 | 4 hours | None | 4½ | Control |
| | do. | 15 psig. | 4½ | 4% |
| | do. | 50 psig. | 5 | 8 |
| | do. | 100 psig. | 5½ | 14 |

EXAMPLE 3

Ingredients as in Example 1 were added to a ball mill; except ingredients 3–6 were pressurized at 100 p.s.i.g. of carbon dioxide. Thus the solvent was precarbonated. A control sample was run simultaneously. The finished products were reduced and measurements taken as in Example 1 with the following results:

| Test | Grind Time | $CO_2$ | Fineness | Increased Tint Strength |
|---|---|---|---|---|
| 5 | 2½ hrs. | None | 3½ | Control |
| | do. | 100 psig. | 4 | 6% |
| 6 | 6 hrs. | None | 4½ | Control |
| | do. | 100 psig. | 4½ | 13% |

EXAMPLE 4

Ingredients as in Example 1 except that ingredient 6 was replacd by Xylol, 890 parts of the Xylol was added to the mill, and all the ingredients were exposed to carbon dioxide prior to milling but at varying pressures. The following results were obtained:

| Test | Grind Time | $CO_2$ | Fineness | Increased Tint Strength |
|---|---|---|---|---|
| 7 | 4 hours | None | 4 | Control |
| | do. | 7 psig. | 4 | 7% |
| | do. | 15 psig. | 4¾ | 21 |
| | do. | 25 psig. | 4 | 15 |
| | do. | 50 psig. | 4 | 9 |
| | do. | 75 psig. | 4¾ | 9 |
| | do. | 100 psig. | 5 | 14 |

EXAMPLE 5

| | Parts by weight |
|---|---|
| 1. Benzidene Yellow | 318 |
| 2. Primrose Chrome Yellow | 1702 |
| 3. VM & P Naptha | 1064 |
| 4. Ethyl Cellulose Solution 25% N.V. in Lacquer Diluent Hydrocarbon Solvent | 1064 |
| 5. Zinc Resinate and Ethyl Cellulose Solution | 5320 |
| 6. Toluol | 532 |

Ingredients 3–6 were precarbonated as in Example 3. The following results were obtained:

| Test | Grind Time | $CO_2$ | Fineness | Increased Tint Strength |
|---|---|---|---|---|
| 8 | 4 hours | None | 6 | Control |
| | do. | 100 psig. | 6½ | 12% |

EXAMPLE 6

Ingredients as in Example 1 were ground for 4 hours and then reduced. Various samples of this ink were then exposed to carbon dioxide at various pressures and agitated for 15 minutes. The following results were obtained:

| Test | Grind Time | $CO_2$ | Fineness | Increased Tint Strength |
|---|---|---|---|---|
| 9 | — | None | — | Control |
| | — | 30 psig. | — | 4% |
| | — | 50 psig. | — | 5 |
| | — | 100 psig. | — | 10 |

The above examples show that paints and inks, from formulas easy to grind to formulas difficult to grind, have improved fineness when ground in the presence of carbon dioxide, either by precarbonation of solvents or by introduction into the mill. The examples also show that the addition of carbon dioxide to these products, by precarbonation, postcarbonation, or adding in the mill, improves the "tinctorial strength" of the end product. It can be seen that the tests include a broad range of organic solvents.

SKIN RETARDING EFFECT BY CARBONATION

Two varnishes which normally skin readily were tested on a comparison of uncarbonated and carbonated for skinning characteristics. The varnishes were Polyurethane Gloss Varnish, and Phenolic-Wood Oil Marine Gloss Varnish. The carbonated samples were carbonated in a pressure chamber at 15 p.s.i.g. for 19 hours in open, friction-top pint cans. As soon as they were removed from the pressure chamber the lids were applied. The cans were stored at room temperature along with corresponding uncarbonated sample cans of the same lot. Periodically these cans were reopened and observed for skins. Before reclosing the free-gas was wafted away with brisk fanning. Carbonation has a definite skinning retardation effect.

POLYURETHANE GLOSS VARNISH

| Days | Uncarbonated Can | Carbonated Can |
|---|---|---|
| 0 Days | Test started | Test started |
| 3 Days | Soft skin forming on lid | Pressure releases when opened; no skinning |
| 5 Days | Skin forming on varnish surface, skin on lid firm | No skin evidence, no pressure evident when lid removed |
| 10 Days | Firm skin on varnish | |
| 14 Days | Firm skin | No skin |
| 20 Days | Firm skin | No skin |
| 27 Days | Firm skin | No skin |

PHENOLIC-WOOD OIL MARINE VARNISH

| Days | Uncarbonated Can | Carbonated Can |
|---|---|---|
| 0 Days | Test started | Test started |
| 3 Days | Skin forming on lid and on varnish surface | Pressure release when opened; no skinning |
| 5 Days | Firm skin | No skin evident, no pressure release |
| 10 Days | Firm skin | |
| 14 Days | Firm skin | No skin |
| 20 Days | Firm skin | No skin |
| 27 Days | Firm skin | Soft skin forming on lid and on varnish surface |

EFFECT OF CARBONATION ON FLASH POINTS

Various solvents were placed under 50 p.s.i.g. pressure of carbon dioxide for twelve hours. Flash points were determined by a "Tag" closed tester for liquids below 175° F. manufactured by C. J. Tagliabue Mfg. Co. of Brooklyn, N.Y. Carbonation raised the flash point in each instance. Flash points in the following chart are the average of three tests in each instance.

| Material | Carbonated | Uncarbonated |
|---|---|---|
| Mineral Spirits | 112.3° F. | 110.2° F. |
| Xylol | 91° | 79° |
| Toluol | 45.3° | 39° |
| VM&P Naptha | 55.7° | 52.3° |

EFFECT OF CARBONATION ON CONDUCTIVITY

Various solvents were subjected to 100 p.s.i.g. pressure of carbon dioxide and their conductivity measured with a DeVilbiss Microampere DC Meter. Carbonation increased the conductivity in each instance.

| Material | Carbonated | Uncarbonated |
|---|---|---|
| N-Butyl Alcohol | 65 ua | 30 ua |
| Isopropyl Alcohol | 68 ua | 54 ua |
| Acetone | 80 ua | 68 ua |

CONCLUSION

The degree of rate of dispersion as evaluated by a fineness gage improves with increased carbonation roughly proportionately in the range of 7–100 p.s.i.g. Carbonation also results in increased "tinctorial strength" at all pressures from 7–100 p.s.i.g. but the increase is not proportional in all tests. With greater "tinctorial strength" and greater quality of dispersion, greater brightness of color is observed in the products. The above pressures in precarbonation, postcarbonation, or added during milling, interstitially spaces over one volume of carbon dioxide per volume of solvent. The final product will have from over one volume per volume up to four volumes per volume of carbon dioxide added. Alcohol solvents are capable of absorbing somewhat greater quantities of carbon dioxide, however.

CARBONATED ORGANIC SOLVENTS

As explained above, carbonated products (e.g., inks) have advantages during use. Among the advantages of carbonated inks are (1) increased print out, (2) a decrease in static charges on the press, and (3) a reduction in flashing potential.

In the present usage, ink is ordinarily thinned by the addition of an equal amount of organic solvent prior to placing in the ink fountain of a press. By substituting carbonated organic solvent for regular solvent, the above advantages can be obtained. Preferably, the organic solvent has carbon dioxide interstitially spaced in an amount such that the final ink mix has over one volume per volume of carbon dioxide therein. Thus, if 50 percent of the final ink mix is organic solvent, as is usual, the carbonated organic solvent preferably has greater than two volumes of carbon dioxide per volume of organic solvent. Of course carbonated organic solvent having greater than one volume of carbon dioxide per volume of organic solvent is useful for mixing with carbonated ink having at least the same amount of carbonation. This will give the same advantages enumerated.

As illustrations of carbonated organic solvents, several organic solvents were pressurized at 100 p.s.i.g. of gaseous carbon dioxide until equilibrium was reached. Three tests were made on each carbonated organic solvent and the following results were obtained:

| ORGANIC SOLVENT | VOLUMES OF CARBON DIOXIDE |
|---|---|
| Hexane | 14.3 |
| Heptane | 11.6 |
| Mineral Spirits | 10.9 |
| V M & P Naphtha | 11.1 |
| Toluol | 14.8 |
| Xylol | 12.2 |

METHOD OF PRINTING

Printing using carbonated inks includes the placing of the ink containing carbon dioxide into an ink fountain or receptacle, and supplying the carbonated ink to the printing mechanism which applies it with direct pressure to the material being printed.

Test 1: A regular yellow ink having a regular solvent (Tolusol 30) were used for a selected printing on gravure press. Thereafter, the regular ink was replaced with a carbonated yellow ink containing in excess of one volume of carbon dioxide per volume of the organic solvents therein. Copies of each were checked for printability, hue, strength and characteristics. During each run, readings of static charges were taken on the cylinder with a WSM–2,950 Static Meter from Western Static Eliminator Company. Finally, the regular ink and the carbonated ink were placed in half-pint cans and ignited. The following results were observed:

1. No press difficulty was encountered in the changeover.
2. There was an increase in print out.
3. Static charges decreased from 35,000–40,000 volts using regular ink to 10,000–15,000 volts using carbonated ink.
4. The regular ink burned rapidly, while the carbonated ink glowed but extinguished itself immediately.

Figures 2, 3:
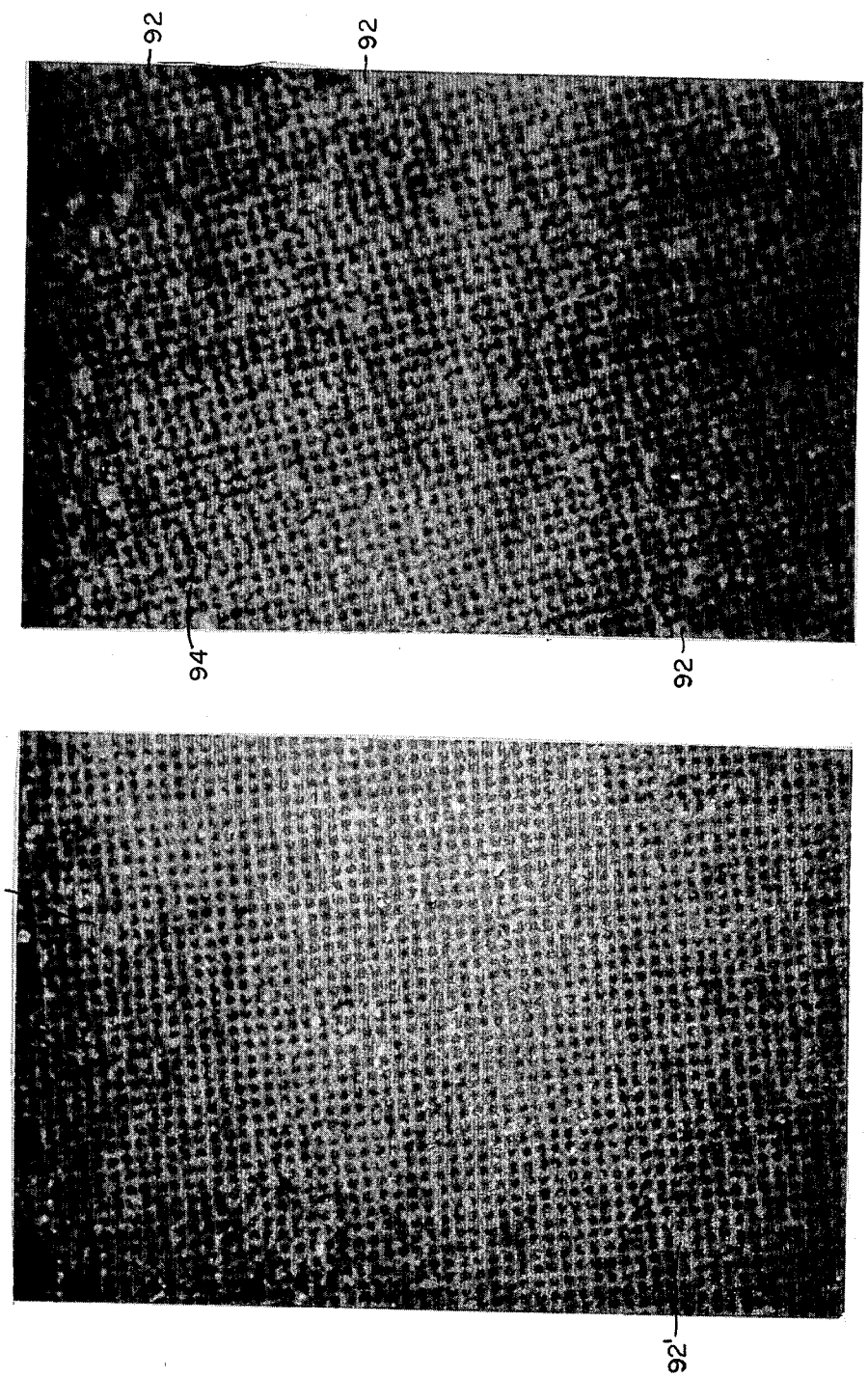
FIG. 2 is a reproduction of a micro-photograph of a gravure printing utilizing carbonated ink.
FIG. 3 is a reproduction of a micro-photograph of a gravure printing utilizing the same plate as in FIG. 2 but with regular ink.

Test 2: The procedure of Test 1 was followed except that yellow, red, blue and black inks were tested. The following results were observed:

1. and 4. Same as Test 1.
2. There was an increase in print out. FIGS. 2 and 3 are photolithographs of micro-photographs of the results with the yellow carbonated ink and yellow regular ink, respectively. In the area of FIG. 3, there are about 27 voids (dots missing) indicated at 92. In FIG. 2, there are about seven dots missing as indicated at 92'. Additionally, the dots with carbonated ink are more regular and defined. There is less blurring between dots as seen, for example, at 94 in FIG. 3. The white specks in both FIGS. 2 and 3 are caused by the photographic process and should be ignored.
3. An average of three static charge readings gave the following results on two successive days:

DAY 1:

|  | Yellow (volts) | Red (volts) | Blue (volts) | Black (volts) |
|---|---|---|---|---|
| Carbonated Inks | 7,500 | 9,000 | 10,500 | 3,500 |
| Regular Inks | 24,000 | 18,000 | 18,000 | 28,000 |

DAY 2:

|  | Yellow (volts) | Red (volts) | Blue (volts) | Black (volts) |
|---|---|---|---|---|
| Carbonated Inks | 13,000 | 10,500 | 18,000 | 19,000 |
| Regular Inks | 17,000 | 17,000 | 16,500 | 57,000 |

Test 3: The procedure of Test 2 was followed under controlled humidity (46 percent) and temperature (67°), with the following results:

(1), (2) and (4) Same as test 1.
(3) Static charges decreased from an average 25,000 volts on regular inks to about 10,000 volts on carbonated inks.

It has also been found that more reasonable results are obtained with carbonated inks in a proofing press which is used to check plates for proper etching.

The improved print out of FIG. 2 is surprising. While it is not known exactly why this occurs with carbonated ink, it is theorized that it may be the result of mechanical agitation or normal increased press temperature either of which would cause the carbon dioxide to evolve from the ink. In the gravure press, the ink is at relatively calm position in the fountain. When the roll of the gravure cylinder passes through the ink fountain the carbonated ink is picked up at moderate rest. Immediately afterwards a steel blade called the doctor blade scrapes off excess ink. The doctor blade operates under considerable pressure at a high rate of speed commensurate with the rate of roll of the cylinder. This does two things. It causes a severe agitation or shear at the surface of ink under the doctor blade and possibly increases the temperature locally. These two factors cause carbon dioxide to evolve. It is theorized that the ink then filled with bubbles of carbon dioxide puffs up to a point that it sits proud of the roll and is more easily picked up by the paper and more efficiently picked out of the cavities in the gravure roller. It is also possible that the carbon dioxide lowers the surface tension of the ink with the improved result described.

In placing the ink containing carbon dioxide into an ink fountain or receptacle, it is advantageous to mix on site a pigmented product with a volatile liquid organic solvent having gaseous carbon dioxide interstitially spaced therein. One advantageous arrangement is to provide apparatus for carbonating the solvent at the printing site.

Figure 4:
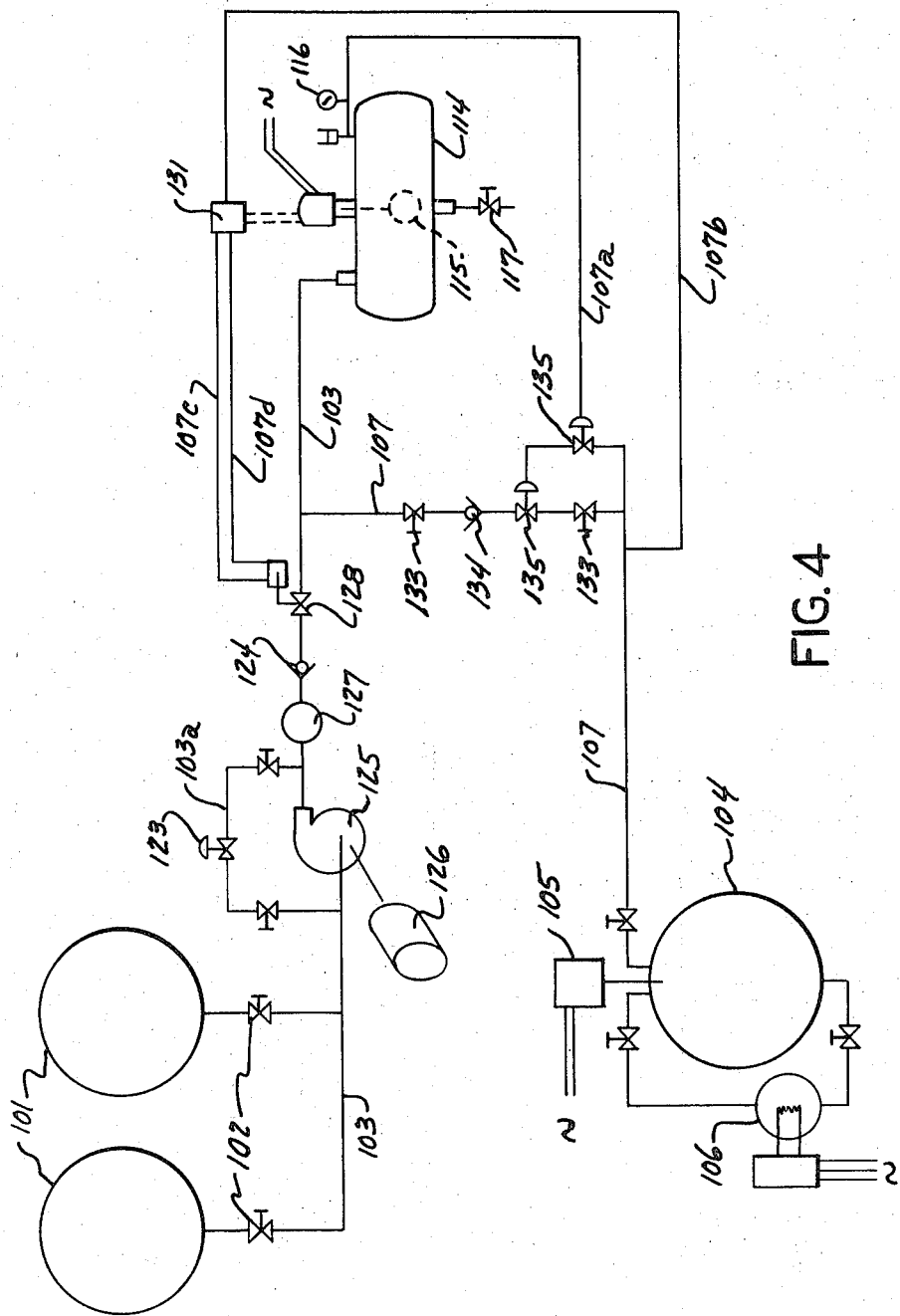
FIG. 4 is a diagrammatic view of an apparatus suitable for carbonating solvent.

FIG. 4 illustrates one suitable apparatus for carbonating the volatile liquid organic solvent. As shown, two solvent storage tanks 101 are each provided with an outlet valve 102 which controls flow to a supply line 103. The tanks 101 may, for example be 10,000 gallon tanks mounted in suitable saddles (not shown) and provided with an explosion proof pump (not shown) for tank car unloading of the solvent to the tanks 101. The storage tanks 101 are advantageously provided with flame arresters (not shown).

A storage unit 104 is provided to store liquid carbon dioxide without loss at 300 p.s.i.g. and 0° F. The unit is conveniently of 6 ton capacity, formed of fiberglass reinforced with resin plastic and insulated with polyurethane. Refrigeration is provided by a ¾ HP condensing unit 105. A vaporizer 106 converts the liquid carbon dioxide to gas preparatory to feeding a gas line 107.

A carbonating unit 114 is connected to supply line 103 and to branch 107a of gas line 107. The level of solvent in the unit 114 is controlled by a float 115 in a manner hereafter described. The amount of gaseous carbon dioxide flowing to unit 114 is controlled by adjusting the pressure which is recorded on gauge 116. After sufficient agitation, the solvent will have the carbon dioxide interstitially spaced therein. The carbonated solvent can then be withdrawn through a valve 117 to a point of usage such as the fountain or a mixing room.

Interposed in supply line 103 is a positive displacement pump 125, a recording meter 127, a check valve 124, and an electrically actuated, air-operated ball valve 128. The pump 125 is driven by a motor 126 and is capable of delivering the solvent at a pressure up to 125 p.s.i.g. A bypass line 103a around the pump has a relief valve 123 therein.

The ball valve 128 is controlled by the float 115 in the carbonating unit 114. Whenever there is a reduction in the liquid level of the unit 114, the float 115 actuates a four-way solenoid valve 131 at the end of a branch 107b of gas line 107. Valve 131 directs the gas through lines 107c and 107d to control opening or closing of valve 128. Simultaneously with opening valve 131, controls start operation of the pump 125, and vice versa.

Preferably, some gaseous carbon dioxide is fed into supply line 103 before the solvent reaches the carbonating unit 114. For this purpose gas line 107 connects to line 103 after valve 128. It has been found desirable that this connection be at least 10 feet prior to entry of the materials into the carbonating unit. Interposed in gas line 107 are two disassembly valves 133 between which are a check valve 134 and a piloted pressure regulator 135.

It is now deemed obvious that there has been disclosed improved products in the form of carbonated paints, inks and solvents as well as an improved method of printing. The carbonated ink, and the method of printing using it, results in increased print out and increased safety through reduction of fire hazards.

The invention in its broader aspects is not limited to the specific steps, processes, compositions and apparatus shown and described, but departures may be made therefrom within the scope of the accompanying claims without departing from the principles of the invention and without sacrificing its chief advantages.

I claim:

1. In combination, a resealable container; a removable lid on the container; and a substantially homogeneous product in the container comprising a liquid organic solvent, a pigment dispersed in the solvent, and gaseous carbon dioxide interstitially spaced in the liquid organic solvent in an amount sufficient to evolve into the head space to thereby provide an inert atmosphere which represses skinning of the product; whereby the container may be opened and thereafer resealed, and a protective atmosphere evolved in the head space.

2. The combination of claim 1 wherein the amount of carbon dioxide is in excess of one volume per volume of liquid organic solvent.

3. The combination of claim 2 wherein the amount of carbon dioxide ranges up to about four volumes per volume of liquid organic solvent.

4. In combination, a container having an opening at its top; a volatile product in the container and having an upper level below the top of the container so that there is head space above the product level; the volatile product comprising a mixture of a pigment, a volatile liquid organic solvent in which the pigment is dispersed, and gaseous carbon dioxide interstitially spaced in at least the volatile liquid organic solvent in an amount in excess of one volume of carbon dioxide per volume of solvent to evolve into the head space and thereby provide an inert atmosphere which represses flammability of the product; the product also having increased conductivity to repress build up of static charges and thereby reduce any explosion potential.

* * * * *